Jan. 5, 1943. J. D. CRECCA 2,307,026
SUBAQUEOUS END WELDING DEVICE
Filed Oct. 25, 1940
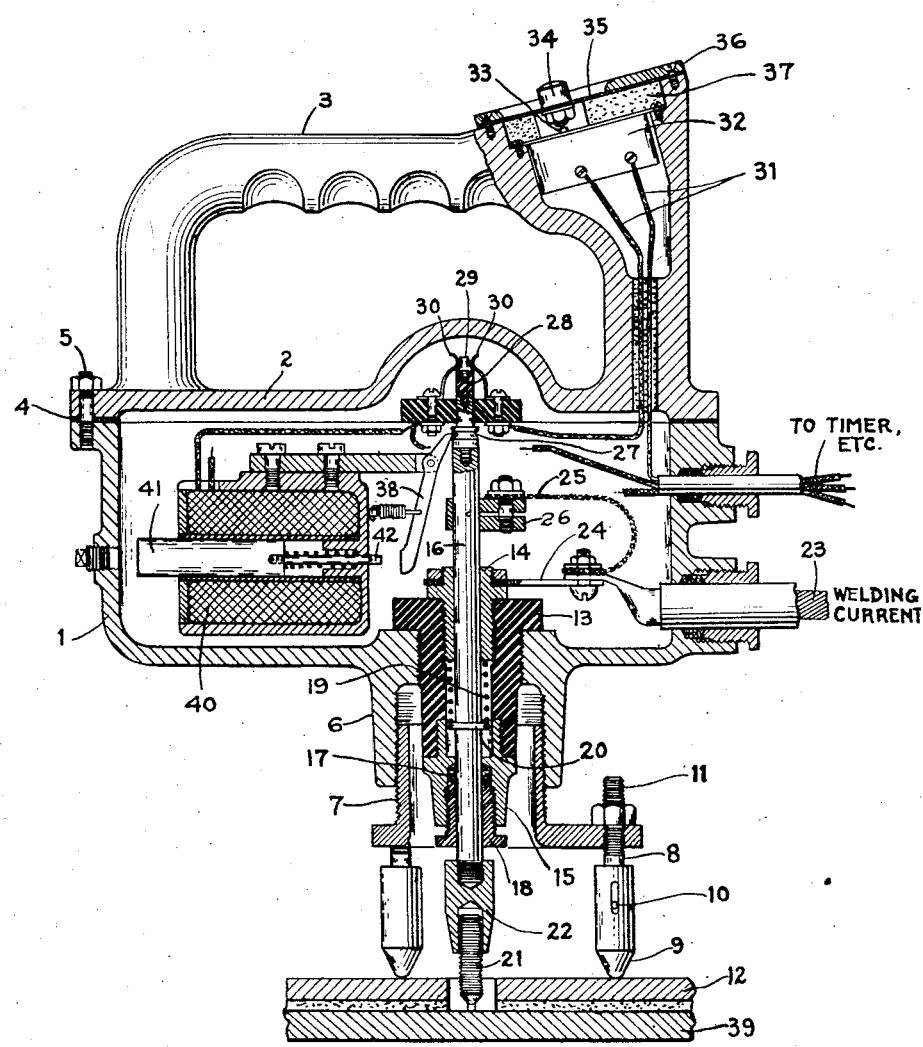
INVENTOR
JOHN D. CRECCA.
BY William Jones
ATTORNEY Patented Jan. 5, 1943

2,307,026

UNITED STATES PATENT OFFICE 2,307,026

SUBAQUEOUS END WELDING DEVICE

John D. Crecca, United States Navy

Application October 25, 1940, Serial No. 362,714

3 Claims. (Cl. 219—4)

(Granted under the act of March 3, 1883, as amended April 30, 1928; 370 O. G. 757)

This invention relates to apparatus for end welding studs, bolts and the like to another member and more particularly to a device of that type adapted for use under water.

The principal object of this invention is to provide an end welding gun wherein provision is made to exclude water from the mechanism to prevent short circuiting of the current carrying portions and also to prevent corrosion of the moving metal parts.

The single figure of the drawing is an elevational view, principally in section, of one embodiment of my invention that has been found to operate successfully.

The body or principal housing member 1 may be of any suitable material, such as metal or synthetic plastic. This member is in general cup-shaped and the open side thereof is closed by a member 2 which carries the manipulating handle 3 and is maintained in watertight relation with the member 1 by packing 4 and a series of studs 5.

The lower side of member 1 has formed on it a substantially cylindrical hollow extension 6 that is internally threaded to engage the threads on a sleeve 7 to which the legs 8 are secured, this construction permitting adjustment of the effective length of legs 8 with respect to member 1. The legs 8 are preferably three in number and are longitudinally resilient by reason of a spring (not shown) within the foot member 9 which has a pin and slot connection 10 with the bolt 11. The reason for this resilient construction, which is of a type that is well known, is to permit adjustment of the length of the legs for minor inequalities in the surface of the plate 12 against which the feet 9 rest and also to make it possible for the operator to exercise a firm pressure of the tool against the member 12 to steady the same without the undesirable rigidity that would be present if the legs 8 were continuous and solid.

An insulating bushing 13 is in watertight engagement with the body member 1 and has threaded into it the bearing member 14 and stuffing box 15. The spindle 16 is slidable in bearing 14 and in the stuffing box 15, the watertight integrity of the interior of body 1 being maintained by packing 17 compressed by packing gland 18. A spring 19 is mounted under compression between bearing 14 and collar 20 on spindle 16 to move the spindle outwardly, or toward the work, as will be hereinafter set forth.

Welding current is supplied to stud 21 in chuck 22 carried by spindle 16 through a lead 23 that is connected to bearing 14 by the strap 24 and also, through flexible lead 25 and connecting element 26, directly to the spindle 16. The upper end of spindle 16 carries an element 27 having a latch engaging shoulder. Insulating member 28 is secured to the member 27 and carries a conductive circuit closing element 29 that serves to close the circuit between spring contacts 30 when in the position shown. The contacts 30 are in series in a control circuit 31 that also includes a switch 32 in series. The switch 32 includes an element 33 that closes the switch when depressed and which is disposed to be contacted by a portion of a button 34 that extends through a waterproof flexible membrane 35 that is clamped at its edges to the handle 3 by means of a ring 36. Between the membrane 35 and the switch 32 is disposed a compressible body 37, which may be sponge rubber, that prevents untimely closing of the switch through depression of membrane 35 by water pressure but will nevertheless yield when the operator presses upon button 34 and permit closing of switch 32.

When a stud 21 is inserted in chuck 22 the plunger 16 is pushed upwardly and spring biased latch 38 engages the shoulder of member 27 to hold the spindle in cocked position with the control circuit closed through the contacts 30 by the element 29. Arc initiating material as disclosed in Patent 2,115,707 to Crecca and Scott, is placed on the work 39 at the spot to which the stud is to be welded if the work is under the operator or is adhesively retained on the end of stud 21 if the work surface 39 is vertical or overhead. The operator then positions the device so that stud 21 is opposite the situs of the weld and presses down so that the pins 10 in the feet 9 will be at the bottom of the slots in which position the stud 21 will be at the proper arc length distance from the work 39.

When the operator presses button 34 the control circuit 31 is energized and through a relay, (not shown) as is well known in this art, the welding circuit is closed to supply current to the lead 23 and to work 39 and at the same time a timer (not shown) of conventional construction is set into operation to time the duration of the arc. After the predetermined interval for the flow of welding current, the timer connects solenoid 40 to a source of current which energizes the solenoid and draws the core 41 into the solenoid, causing pin 42 carried by core 41 to contact latch 38 and disengage the same from the shoulder of member 27. When this is done the spring 19 moves the plunger 16 outwardly so that the stud 21 is thrust into the pool of molten metal in the work 39 and the weld is completed. When the spindle 16 is moved outwardly the circuit through contacts 30 is broken which stops the operation of the timer and releases the relay that closes the welding circuit. Since the construction of such relays and timers and the operation thereof are very well known in this art it is deemed unnecessary to illustrate the same or further describe them.

It is to be understood that the terms "subaqueous" and "water" are illustrative only and are intended to cover other liquids such as oil. Also, that the term "stud" includes any type of element that may be end-welded.

The invention herein described and claimed may be manufactured and used by or for the Government of the United States of America for governmental purposes without the payment of any royalties thereon or therefor.

I claim:

1. A device for subaqueous welding, comprising a watertight hollow body, a plunger slidably mounted therein, said plunger having one end extending beyond one wall of said body and a latching head at the other end, means to insulate said plunger from said body, a watertight gland around said plunger, a spring tending to slide said plunger outwardly, a spring biased latch engageable with said head, a solenoid mounted in said body, a core in said solenoid movable when said solenoid is energized to disengage said latch, a circuit closing conductive member insulatingly carried by the other end of said plunger, a pair of contacts disposed to be conductively connected by said member when said latch is engaged with said head, a control circuit including said pair of contacts and a watertight switch operable to close said circuit, means governed by said control circuit to supply welding current to said plunger, an electrode holder fixed to said one end of said plunger, and longitudinally yieldable legs connected to said body and adapted to rest against a work piece to which an electrode in said holder is to be welded.

2. A device for subaqueous welding, comprising a watertight hollow body, a plunger slidably mounted therein, said plunger having one end extending beyond one wall of said body and a latching head at the other end, means to insulate said plunger from said body, a watertight gland around said plunger, a spring tending to slide said plunger outwardly, a latch biased to engage said head, means electrically actuatable to disengage said latch from said head, a circuit closing conductive member insulatingly carried by the other end of said plunger, a pair of contacts disposed to be conductively connected by said member when said latch is engaged with said head, a control circuit including said pair of contacts and a watertight switch operable to close said circuit, means governed by said control circuit to supply welding current to said plunger, an electrode holder fixed to said one end of said plunger, and longitudinally yieldable legs connected to said body and adapted to rest against a work piece to which an electrode in said holder is to be welded.

3. A device for subaqueous welding, comprising a watertight hollow body, a plunger slidably mounted therein, said plunger having one end extending beyond one wall of said body and a latching head at the other end, means to insulate said plunger from said body, a watertight gland around said plunger, means to project said plunger outwardly, means to hold said plunger in retracted position in said body, electrically actuatable means to release said holding means, circuit closing means effective when said plunger is retracted including a conductive element insulatingly carried by said other end of said plunger, a control circuit including said circuit closing means and a watertight switch, an electrode holder carried by said one end of said plunger, and means governed by said control circuit to supply welding current to said electrode holder.

JOHN D. CRECCA.